United States Patent [19]

Koudstaal

[11] Patent Number: 4,470,749
[45] Date of Patent: Sep. 11, 1984

[54] METHOD FOR UNLOADING BULK FREIGHT FROM A CARGO BODY OR CONTAINER AS WELL AS CARGO BODY OR CONTAINER FOR CARRYING OUT THE METHOD

[75] Inventor: Willem Koudstaal, Vinkeveen, Netherlands

[73] Assignee: Koninklijke Emballage Industrie Van Leer B.V., Amstelveen, Netherlands

[21] Appl. No.: 386,268

[22] Filed: Jun. 8, 1982

[30] Foreign Application Priority Data

Jun. 12, 1981 [NL] Netherlands ................... 8102845

[51] Int. Cl.³ ............................................. B60P 1/00
[52] U.S. Cl. .................................. 414/539; 222/392; 414/786
[58] Field of Search ............... 414/393, 400, 527, 539, 414/786; 198/750, 630; 222/386.5, 392; 298/1 B

[56] References Cited

U.S. PATENT DOCUMENTS

| 3,443,703 | 5/1969 | Matsumoto | 414/539 |
| 3,868,042 | 2/1975 | Bodenheimer | 220/403 |
| 4,277,220 | 7/1981 | Wiley | 414/539 |

FOREIGN PATENT DOCUMENTS 2351881 12/1977 France .
527916 10/1940 United Kingdom .

Primary Examiner—Joseph E. Valenza
Assistant Examiner—Stuart Millman
Attorney, Agent, or Firm—Brumbaugh, Graves, Donohue & Raymond

[57] ABSTRACT

A method for unloading bulk freight from a cargo body or container 3 or other storage space provided internally with a foil 4. The bulk freight is unloaded through an under edge of the bottom 10 of the cargo body or container 3. Before filling, a continuous foil web 4 is provided at least over the bottom 10 and a portion of the front wall opposite of the unloading edge or side wall. The foil web 4 is laid down over the bottom in a sequence of folds 5. The foil 4 is pulled outwards over the unloading edge for unloading the cargo.

12 Claims, 3 Drawing Figures

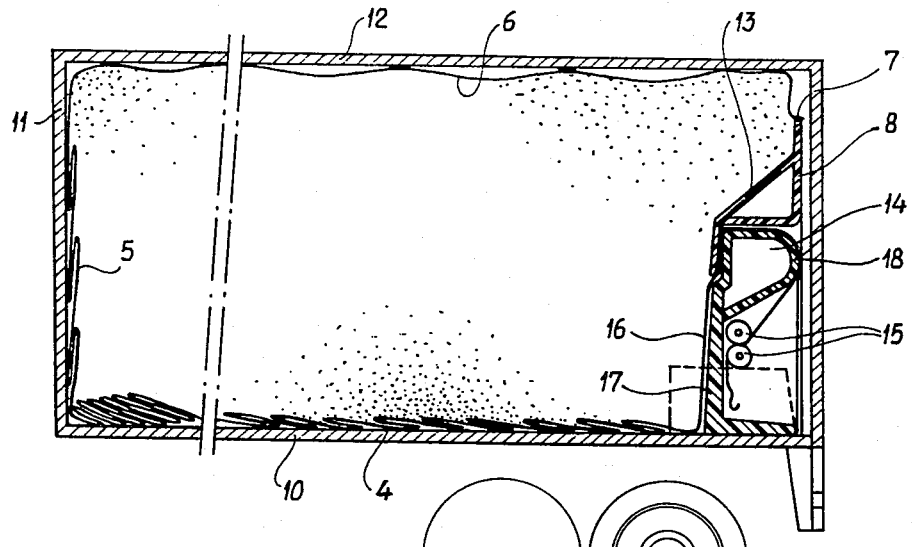
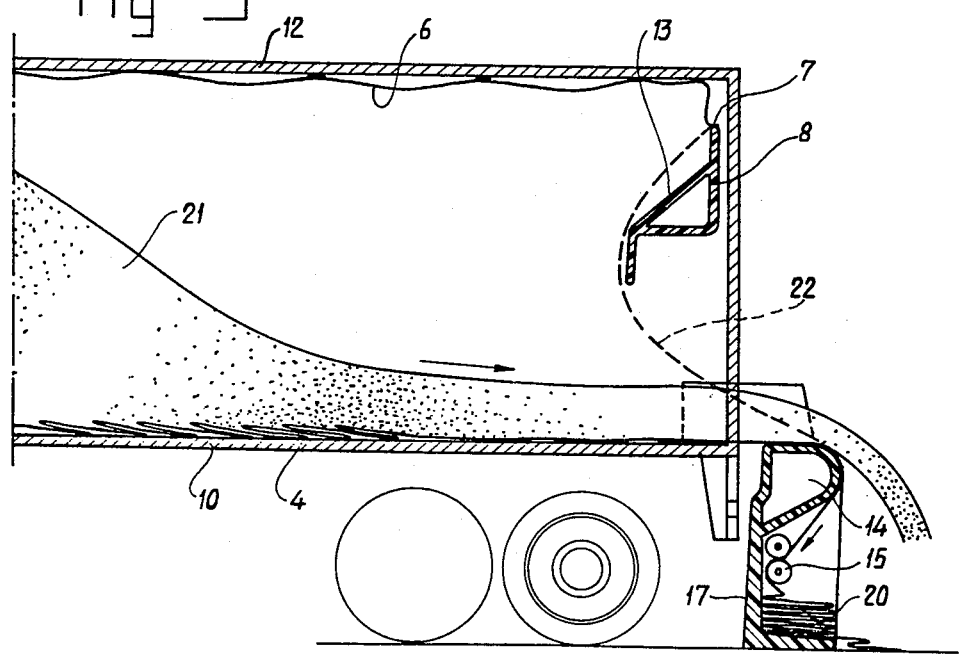

METHOD FOR UNLOADING BULK FREIGHT FROM A CARGO BODY OR CONTAINER AS WELL AS CARGO BODY OR CONTAINER FOR CARRYING OUT THE METHOD

The invention relates to a method for unloading bulk freight from a cargo body or container or other storage spaces provided with a foil internally, said unloading takes place through an under edge of the bottom of the cargo body or container.

Such a method is known from the U.S. Pat. No. 3,868,042. Therein the foil provided in the form of a bag in engaging relation within the cargo body or container serves only as protection and unloading is carried out by positioning the cargo body or container in an inclined position by means of a lifting apparatus so that the bulk freight may slide outwards over the unloading edge. Similar lifting apparatuses are not provided everywhere and represent often a complication.

With stationary storage spaces, such as silos the unloading is carried out with a hopper requiring a relatively large apace and in which arching may occur by which the unloading is interrupted.

Therefore, the invention has the object to provide a method by which it is possible to remove the bulk freight from the cargo body or container in a quick and efficient way without the necessity to position this in an inclined position respectively in stationary storage spaces to unload the bulk freight without hopper and without interruption. According to the invention this object is achieved in that before filling, at least over the bottom and a portion of the front wall or side wall opposite of the unloading edge a continuous foil web is provided, which at least over the bottom is laid down in a sequence of folds, said foil is pulled outwards over the unloading edge on behalf of unloading the cargo. Now, for unloading one needs only to pull the foil outwards, in which the folds provide that as far as in the corner most remote from the unloading edge the cargo of bulk freight resting on the foil moving outwards may be advanced. Thereby, after unfolding the foil lying on the bottom, the foil engaging the front or side wall is pulled into an inclined position, by which the final remainder of the material can be fed outwards.

In order to obviate too heavy loads on the foil by the cargo and too high friction forces it is of importance to define accurately the number and length of the folds and it is preferred that the number of folds per running meter and/or the length of the folds increase from the unloading edge to the opposite wall in order that an advanced portion is unloaded before the subsequent should start to move.

With a large spacing between the unloading edge and the opposite wall and with certain sorts of bulk freight it may be necessary that the foil is extended as far as the upper edge of the wall opposite of the unloading edge and eventually further along the roof as far as an edge above the unloading edge for attaining that also then, the cargo is fetched completely to the unloading edge after the greatest part is unloaded by unfolding the foil lying on the bottom.

When it is unloaded along a short distance, for example over a longitudinally extending long side edge, then usually is suffices to have a foil extending maximally up to the upper edge of the side wall opposite of the unloading edge and a foil engaging against the upper wall is not necessary.

The cargo body or container suitable for using the method according to the invention is characterized in the first place in that adjacent to the unloading edge this is provided with one or more rollers to be driven and through which or over which the foil is guided. Said rollers may be located within the cargo body but may also be provided externally. Preferably, a wind-up roller is used, but it is also possible to use clamping rollers.

Preferably, the clamping rollers are provided in a support positioned removable within the cargo body or container and that under screening, is provided with a slide surface facing to the contents. If the support is located in the cargo body or container and the foil as usually is clamped with its starting end between the rollers, then the cargo is completely enclosed by the foil, while the rollers are screened with respect to the cargo. The slide surface provides that the bulk freight being at top of the slide surface is discharged with certainty.

Preferably, said support is implemented such that the rollers are located beneath a curved guiding surface over which the foil extends and over which thus, also the cargo is unloaded, which support has storage space for the foil beneath the rollers.

Now, the invention will be explained in details with reference to the drawings.

FIG. 2 is a longitudinal section through the cargo body in closed condition.

FIG. 3 shows the cargo body according to the invention during unloading.

Figure 1:
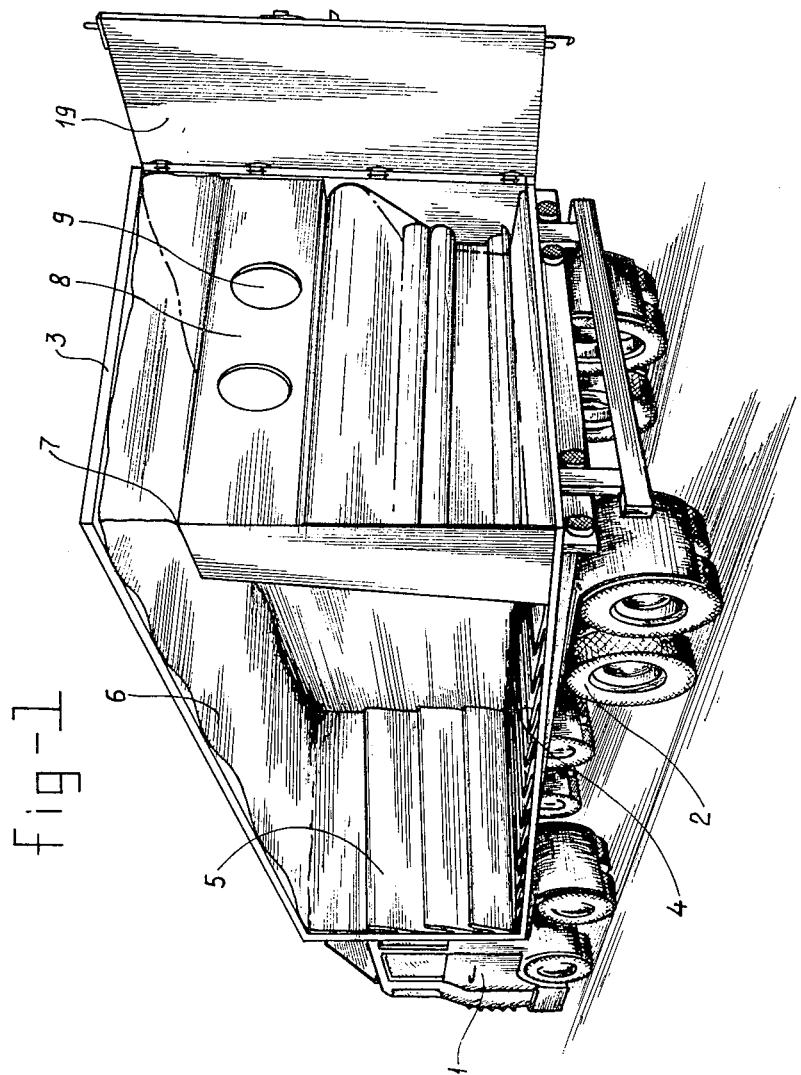
FIG. 1 shows in a perspective view a vehicle having a cargo body with a removed side wall.

FIG. 1 illustrates a track 1 with trailer 2 on which a container 3 is positioned. On the bottom of the container a foil 4 is laid down, which extends upwards along the front wall at 5, as well as along the roof at 6 and meets at 7 a screen 8 to be described in detail and provided with filling apertures 9.

As it appears more clearly from FIG. 2 the foil 4 is laid down on the bottom 10 of the cargo body into a high number of folds extending upwards at 5 along the front wall 11, while at 6 the foil engages the roof 12 of the cargo body. The folds overlap each other such that always the upper portion of a fold is pulled away over the underlying portion so that unfolding is decelerated as little as possible. This would be the case when one should pull a fold portion lying beneath and especially when said portion lies beneath a fold portion loaded by the cargo.

Said foil can be maintained in its position against the front wall 11 and roof 12 by means adapted thereto, such as self-adhesive glues, tangle tape, press-studs etc., i.e. means adapted to carry the weight of the foil but being able to permit to pull loose easily.

At 7 the end of the foil is fixed to a screen 8 in the form of a cross-beam having an inclined guiding surface 13. Under said screen 8, 13 a support 14 is located having two rollers 15 to be driven. The foil extends, as indicated at 16, upwards along the front wall 17 of the support and over the curved guiding surface 18 to the rollers 15. Thereby, the cargo is enclosed completely by the foil as well as by the screen 8, 13.

FIG. 3 shows the situation during unloading. The support 14 is removed from the container now permitted after opening the doors 19 shown in FIG. 1 and said support is placed on the bottom. Thereby the unloading aperture is opened and some bulk freight flows outwards.

When the rollers 15 are driven now the foil material under the cargo is pulled outwards and carries along said cargo in this way as indicated in FIG. 3. During this, the foil is enclosed in the support as indicated at 20.

By the line 21 the slope is indicated as it can be formed during unloading in this way.

When the foil is pulled completely taut over the bottom 16, the portion 5 (FIG. 2) will be unfolded and after this occurrence the foil will be pulled from the roof 12 until a condition is attained as approximately indicated by the interrupted line 22. Then, the cargo is completely removed from the container. In many cases, however, it will be sufficient that the foil 4 is extending over bottom 10 and only a portion of front wall 11.

It will be clear that the invention can also be used with a cargo body open at the upper side even with a foil covering the cargo at the upper side and it will also be clear that the principle of unloading with the unfolding foil can be used when the upper side of the cargo is not covered with a foil respectively no foil is provided against the under side of the roof, but the foil is only located on the bottom and against the wall 11 opposite of the unloading edge.

The foil providing for the unloading of the cargo in the method according to the invention may as shown lie directly on the bottom respectively against a side wall respectively the roof of the cargo body or container. However, said foil may also be provided when the walls and the bottom of the cargo body or container have already been covered respectively are covered with a covering foil, for example in the way as disclosed in the U.S. Pat. No. 3,868,042.

Of course, the foil should be sufficiently strong for accommodating the tensile load during unloading. Such a foil may consist of materials suitable for that purpose, such as plastic, webs of textile material and the like.

I claim:

1. A method of loading and unloading bulk freight from a cargo body, container, or other storage space, said space having side walls, end walls, a bottom and an unloading edge at an edge of the bottom adjacent to one of the walls, comprising the steps of:
   providing at least over the bottom and a portion of the wall opposite said unloading edge, a foil, said foil being laid down over the bottom in a sequence of overlapping folds such that the number of and/or length of the folds per running meter increases from the unloading edge towards the opposite wall;
   thereafter loading said space with bulk freight; and unloading said freight by pulling said foil outwardly over the unloading edge.

2. Method according to claim 1, characterized in that the foil is extended from the upper edge of the wall opposite of the unloading edge along the roof as far as the edge above the unloading edge.

3. A method according to claim 1, comprising the step, prior to loading, of placing a support, over which said foil extends, in said space adjacent to the unloading edge such that the support defines a removable retaining wall for the bulk freight, the foil being interposed between the support and the bulk freight.

4. A cargo body or container having a storage space for containing and unloading bulk freight, comprising: side walls, end walls, and a bottom defining said space; an unloading edge at an edge of the bottom adjacent to one of the walls; a foil extending over at least the bottom and a portion of the wall opposite said unloading edge, said foil being laid down over the bottom in a sequence of overlapping folds such that the number of and/or length of the folds per running meter increases from the unloading edge towards the opposite wall; and driving means for pulling said foil outwardly over the unloading edge for unloading the freight which was placed on the foil.

5. A cargo body or container as defined in claim 4, wherein said driving means comprises a pair of clamping rollers and means for driving said clamping rollers.

6. A cargo body or container as defined in claim 4, wherein said driving means for pulling said foil outwardly comprise one or more rollers adjacent the unloading edge over which the foil extends.

7. A cargo body or container according to claim 6, wherein the rollers are positioned in a support moveable between a storage position, in which it is placed in the cargo body or container, and an unloading position.

8. A cargo body or container as defined in claim 7, comprising a screen, disposed over the support when the support is in the storage position, having a slide surface facing the contents.

9. A cargo body or container as defined in claim 7, wherein said support is constructed to define a retaining wall, facing said bulk freight, when in said storage position, a portion of said foil extending over said retaining wall so as to be interposed between said retaining wall and freight loaded into said space.

10. A cargo body or container as defined in claim 9, comprising a screen, disposed over the support when the support is in the storage position, having a slide surface facing the contents such that said support and screen define a retaining wall over said unloading edge.

11. A cargo body or container as defined in claim 7, wherein said rollers comprise a pair of clamping rollers located in the support, under a curved guiding surface for the foil, and the support has a storage space for the foil beneath the clamping rollers.

12. Means for assisting in unloading bulk freight from a supporting surface having an unloading edge comprising:
   a continuous foil web having a heading edge and extending from said unloading edge along said surface and being laid down on said surface in a sequence of overlapping folds such that the number of and/or length of the folds per running meter increases from the unloading edge in the direction away from said edge whereby upon advancement of the leading edge of said web over said unloading edge, the bulk freight supported thereon is progressively discharged over said unloading edge.

* * * * *